US012158964B2

(12) United States Patent
Goel et al.

(10) Patent No.: US 12,158,964 B2
(45) Date of Patent: Dec. 3, 2024

(54) SYSTEM AND METHOD FOR SAFELY SUPPORTING CUSTOMER SECURITY POLICIES IN A THIRD-PARTY-AS-A-SERVICE SOLUTION

(71) Applicant: Google LLC, Mountain View, CA (US)

(72) Inventors: Atul Goel, San Jose, CA (US); Diganta Paladhi, Karnataka (IN); Manoj Sharma, Monte Sereno, CA (US); Maurilio Cometto, Redwood City, CA (US)

(73) Assignee: Google LLC, Mountain View, CA (US)

( * ) Notice: Subject to any disclaimer, the term of this patent is extended or adjusted under 35 U.S.C. 154(b) by 356 days.

(21) Appl. No.: 17/497,386

(22) Filed: Oct. 8, 2021

(65) Prior Publication Data

US 2022/0129575 A1    Apr. 28, 2022

Related U.S. Application Data

(60) Provisional application No. 63/106,150, filed on Oct. 27, 2020.

(51) Int. Cl.
*H04L 29/06* (2006.01)
*G06F 21/62* (2013.01)

(52) U.S. Cl.
CPC ................ *G06F 21/6218* (2013.01)

(58) Field of Classification Search
CPC .................................... G06F 21/6218
See application file for complete search history.

(56) References Cited

U.S. PATENT DOCUMENTS

| | | | | |
|---|---|---|---|---|
| 11,615,170 B1 * | 3/2023 | Guerra | ............ | G06F 21/62 726/28 |
| 2013/0097701 A1 * | 4/2013 | Moyle | ............ | H04L 63/1416 726/22 |
| 2014/0215603 A1 | 7/2014 | Giblin et al. | | |
| 2014/0215604 A1 * | 7/2014 | Giblin | ............ | G06F 21/6218 726/21 |
| 2017/0346862 A1 * | 11/2017 | Hanhirova | ............ | H04L 63/08 |

OTHER PUBLICATIONS

Fuchs et al. Automating Periodic Role-Checks: A Tool-based Approach. Feb. 1, 2009. 10 pages. Retrieved from the Internet: <https://epub.uni-regensburg.de/6513/1/Automating_periodic_role-checks.pdf>.

(Continued)

*Primary Examiner* — Jason K Gee
(74) *Attorney, Agent, or Firm* — Lerner David LLP (57) ABSTRACT

The present disclosure describes an architecture and design of Unauthorized-Blocking-Role (UAB). UAB is a mechanism which prevents higher privileged users of cloud-hosted software from performing unauthorized activities on protected objects, such as management objects. UAB works by periodically monitoring the permissions of customer users on key management objects in an object hierarchy in management software. If a customer user is detected to have privileges higher than the user should have on those objects, UAB applies restrictive role-based access controls (RBACs) on the user. Similarly, UAB also monitors protected principals and protected roles to ensure that their privileges are not modified by a customer user.

23 Claims, 6 Drawing Sheets

(56) References Cited

OTHER PUBLICATIONS

International Search Report and Written Opinion for International Application No. PCT/US2021/055746 dated Feb. 11, 2022. 15 pages.
International Preliminary Report on Patentability for International Application No. PCT/US2021/055746 dated May 11, 2023. 9 pages.

\* cited by examiner

FIG. 6

SYSTEM AND METHOD FOR SAFELY SUPPORTING CUSTOMER SECURITY POLICIES IN A THIRD-PARTY-AS-A-SERVICE SOLUTION

CROSS-REFERENCE TO RELATED APPLICATIONS

The present application claims the benefit of the filing date of U.S. Provisional Patent Application No. 63/106,150 filed Oct. 27, 2020, the disclosure of which is hereby incorporated herein by reference.

BACKGROUND

Enterprise customers can move to the cloud using lift-and-shift use cases, where customers can lift executables from on-premises machines to the cloud with minimal or no modification to the application and infrastructure ecosystem deployed in their own data centers. For these use cases, on-premises customers typically want to retain their existing workflows, security policies, and administrative models. Since the customer has administrative privileges for their on-premises solution deployments, often they want the same privileges when using the same enterprise software or solution provided by a cloud vendor in an as-as-a-service consumption model. For software applications that run on bare-metal this can be problematic since getting administrative privileges implies carte blanche to modify even the core configuration of the solution. For example, a customer user that is given such administrative privileges can perform unauthorized actions like deleting a host, changing the configuration of a management virtual machine, etc.

Some existing solutions rely on monitoring events that have occurred and that might be unauthorized. A big shortcoming of these solutions is that they are after-the-fact detection approaches. They cannot actually stop an unauthorized activity or operation from occurring, which could result in potentially catastrophic configuration changes and/or data loss as a result of mistakes made by the customer.

BRIEF SUMMARY

The present disclosure describes the architecture and design of an Unauthorized-Blocking-Role (UAB). UAB is a mechanism which prevents higher privileged users of cloud-hosted software from performing unauthorized activities on management or protected objects.

One aspect of the disclosure provides a method of preventing unauthorized activity in a distributed computing system. The method includes periodically scanning, with one or more processors, objects in management software for the cloud computing system, identifying, with the one or more processors based on the scanning, customer users having administrative privileges, and applying, with the one or more processors, role-based access controls (RBACs) for the identified customer users. The periodic scanning may be performed prior to an event of unauthorized activity, such that the applying RBACs is performed as a preventive measure, or as a penalizing measure after detection of an unauthorized event.

Applying the RBACs may include traversing a cloud computing platform object hierarchy, for each object in the hierarchy, classifying the identified users' permissions into one or more buckets, for each object, evaluating the permissions in the buckets, determining an Unauthorized Activity Blocker (UAB) disposition, and applying UAB updates. The one or more buckets may include at least one of a UAB permissions bucket, a direct user level permissions bucket, an inherited user level permissions bucket, a direct group level permissions bucket, or an inherited group level permissions bucket. In some examples, evaluating permissions may include generating an effective user permissions map for the object. In other examples, evaluating permissions may include comparing entries for the identified user across the one or more buckets. Determining the UAB disposition may include determining whether UAB permissions should be newly applied, retained, or modified based on the evaluating of the permissions. Applying UAB updates may include invoking management application programming interfaces.

According to some examples, identifying customer users with administrative privileges may include detecting an escalation of a customer's privileges. In other examples, it includes detecting creation of the customer user with administrative privileges by another customer user.

Another aspect of the disclosure provides a system for preventing unauthorized activity in a cloud computing system. The system may include one or more processors configured to periodically scan objects in management software for the cloud computing system, identify, based on the scanning, customer users having administrative privileges, and apply role-based access controls (RBACs) for the identified customer users. The periodic scanning may be performed prior to an event of unauthorized activity, such that the applying RBACs is performed as a preventive measure, or as a penalizing measure after detection of an unauthorized event.

In applying the RBACs, the one or more processors may be further configured to traverse a cloud computing platform object hierarchy, for each object in the hierarchy, classify the identified users' permissions into one or more buckets, for each object, evaluate the permissions in the buckets, determine an Unauthorized Activity Blocker (UAB) disposition, and apply UAB updates. The one or more buckets may include at least one of a UAB permissions bucket, a direct user level permissions bucket, an inherited user level permissions bucket, a direct group level permissions bucket, or an inherited group level permissions bucket. To evaluate permissions, the one or more processors may be further configured to generate an effective user permissions map for the object, and/or to compare entries for the identified user across the one or more buckets. To determine the UAB disposition the one or more processors may be further configured to determine whether UAB permissions should be newly applied, retained, or modified based on the evaluating of the permissions. To apply UAB updates the one or more processors may be further configured to invoke management application programming interfaces.

To identify customer users with administrative privileges the one or more processors may be further configured to detect an escalation of a customer's privileges, and/or to detect creation of the customer user with administrative privileges by another customer user.

Another aspect of the disclosure provides a non-transitory computer-readable medium storing instructions executable by one or more processors for performing a method of preventing unauthorized activity in a cloud computing system. The instructions may include periodically scanning objects in management software for the cloud computing system, identifying, based on the scanning, customer users having administrative privileges, and applying role-based access controls (RBACs) for the identified customer users.

DETAILED DESCRIPTION

Unauthorized Activity Blocker (UAB) works by periodically monitoring the permissions of customer users on key management or protected objects in an object hierarchy in management software. If a customer user is detected to have privileges higher than what he should have on those objects, UAB applies restrictive role-based access controls (RBACs) on the user. Similarly, UAB also monitors protected principals and protected roles to ensure that their privileges are not modified by a customer user.

UAB may be implemented in a system, such as a cloud computing system. The system may include a plurality of hardware computing devices, and third party server virtualization software. The third party virtualization software may include management software. An example of such system is described below in connection with FIG. 1. The system may be configured to host services that were previously implemented on hardware in a customer's own physical facility, and thus functions as a third party as a service (3PaaS) solution.

Figure 1:
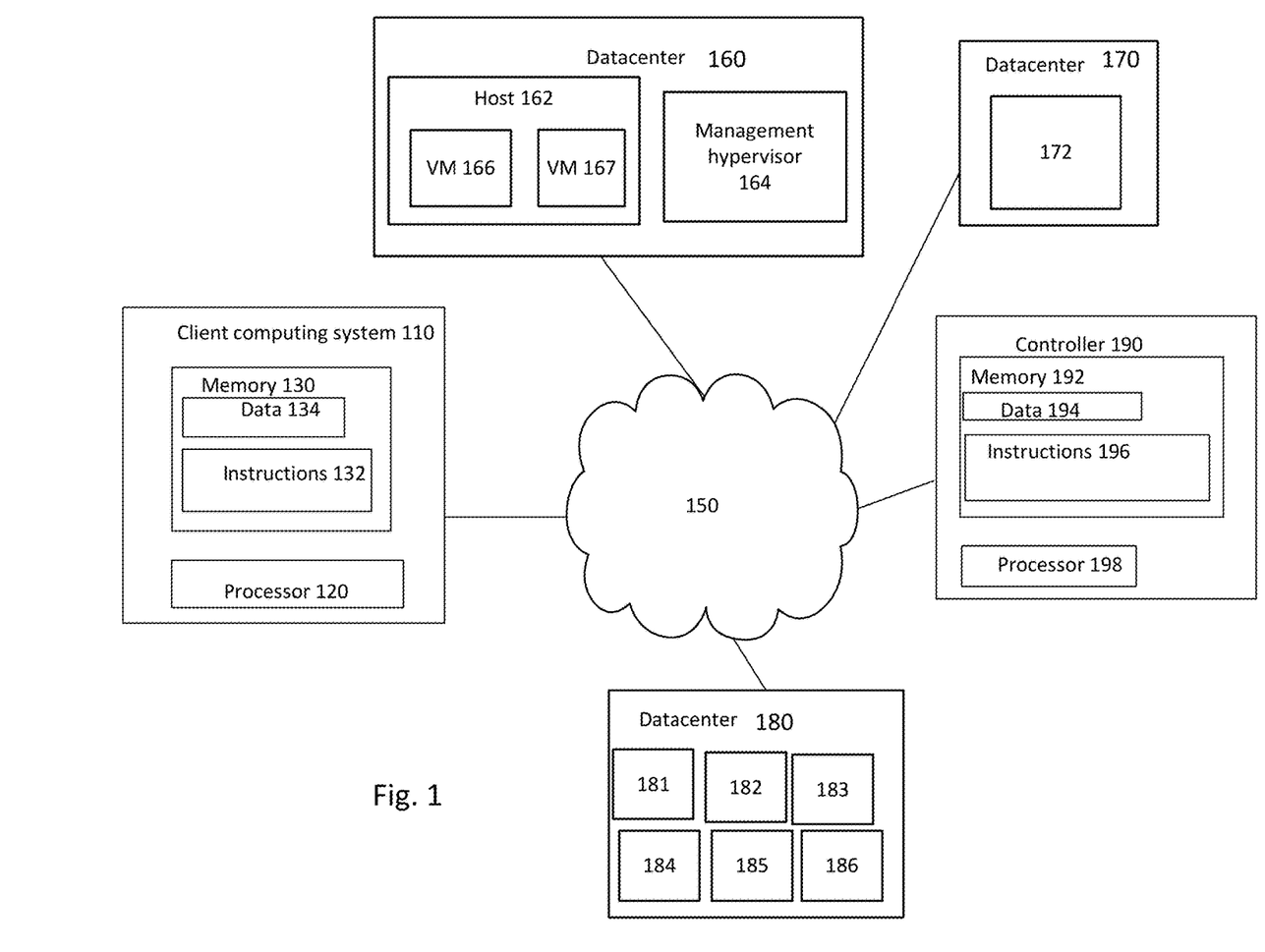
FIG. 1 is a block diagram of an example system according to aspects of the disclosure.

FIG. 1 illustrates an example system including a distributed computing environment. The distributed computing environment may include a Private Cloud as a Service (PCaaS) computing environment. A plurality of datacenters 160, 170, 180 may be communicatively coupled, for example, over a network 150. The datacenters 160, 170, 180 may further communicate with one or more client devices, such as client 110, over the network 150. Thus, for example, the client 110 may execute operations in "the cloud." In some examples, the datacenters 160, 170, 180 may further communicate with a controller 190.

Each client 110 may be a personal computer or a mobile device, intended for use by a person having all the internal components normally found in a personal computer such as a central processing unit (CPU), CD-ROM, hard drive, and a display device, for example, a monitor having a screen, a projector, a touch-screen, a small LCD screen, a television, or another device such as an electrical device that can be operable to display information processed by processor 120, speakers, a modem and/or network interface device, user input, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, tablets, mobile phones, smartwatches, network computers lacking local storage capability, set top boxes for televisions, and other networked devices.

The client 110 may contain a processor 120, memory 130, and other components typically present in general purpose computers. The memory 130 can store information accessible by the processor 120, including instructions 132 that can be executed by the processor 120. Memory can also include data 134 that can be retrieved, manipulated or stored by the processor 120. The memory 130 may be a type of non-transitory computer readable medium capable of storing information accessible by the processor 120, such as a hard-drive, solid state drive, tape drive, optical storage, memory card, ROM, RAM, DVD, CD-ROM, write-capable, and read-only memories. The processor 120 can be a well-known processor or other lesser-known types of processors. Alternatively, the processor 120 can be a dedicated controller such as an ASIC.

The instructions 132 can be a set of instructions executed directly, such as machine code, or indirectly, such as scripts, by the processor 120. In this regard, the terms "instructions," "steps" and "programs" can be used interchangeably herein. The instructions 132 can be stored in object code format for direct processing by the processor 120, or other types of computer language including scripts or collections of independent source code modules that are interpreted on demand or compiled in advance.

The data 134 can be retrieved, stored or modified by the processor 120 in accordance with the instructions 132. For instance, although the system and method is not limited by a particular data structure, the data 134 can be stored in computer registers, in a data store as a structure having a plurality of different fields and records, or documents, or buffers. The data 134 can also be formatted in a computer-readable format such as, but not limited to, binary values, ASCII or Unicode. Moreover, the data 134 can include information sufficient to identify relevant information, such as numbers, descriptive text, proprietary codes, pointers, references to data stored in other memories, including other network locations, or information that is used by a function to calculate relevant data.

Although FIG. 1 functionally illustrates the processor 120 and memory 130 as being within the same block, the processor 120 and memory 130 may actually include multiple processors and memories that may or may not be stored within the same physical housing. For example, some of the instructions 132 and data 134 can be stored on a removable CD-ROM and others within a read-only computer chip. Some or all of the instructions and data can be stored in a location physically remote from, yet still accessible by, the processor 120. Similarly, the processor 120 can actually include a collection of processors, which may or may not operate in parallel.

The datacenters 160-180 may be positioned a considerable distance from one another. For example, the datacenters may be positioned in various countries around the world. Each datacenter 160, 170, 180 may include one or more computing devices, such as processors, servers, shards, or the like. For example, as shown in FIG. 1, datacenter 160 includes computing devices 162, 164, datacenter 170 includes computing device 172, and datacenter 180 includes computing devices 181-186.

According to some examples, the computing devices may include one or more virtual machines running on a host machine. For example, computing device 162 may be a host machine, supporting a plurality of virtual machines 166, 167 running an operating system and applications. While only a few virtual machines 166, 167 are illustrated in FIG. 1, it should be understood that any number of virtual machines may be supported by any number of host computing devices. Moreover, it should be understood that the configuration illustrated in FIG. 1 is merely an example, and that the computing devices in each of the example datacenters 160-180 may have various structures and components that may be the same or different from one another.

According to some examples, the computing devices may further include management tools, such as management hypervisor 164. The management hypervisor 164 may be executed on a management server (not shown), and may execute one or more management virtual machines (not shown). The management hypervisor 164 may provide management services for a private cloud executing in the datacenter 160. Such management services may include, for example, resource management, virtual machine management, virtual machine deployment, task scheduling, statistics, logging, server management, etc. The management services may be executed using third party virtualization software. While only one management hypervisor 164 is shown, it should be understood that any or all of the datacenters 160, 170, 180 may have any number of management tools.

In some examples, management tools may include a separate controller 190 that communicates with the computing devices in the datacenters 160-180. For example, the controller 190 may track the capacity, status, workload, or other information of each computing device, and use such information to assign tasks. The controller 190 may include a processor 198 and memory 192, including data 194 and instructions 196, similar to the client 110 described above. The controller 190 may be configured to maintain consistency of authorization parameters throughout the distributed data store. For example, maintaining consistency may include listening for a particular event by a listener device, which sends a message to storage upon detecting the particular event. A synch device may read the message for storage, and process the message, including updating the backend systems built upon the distributed data store. The listener device and the synch device may be the same device or different device. The controller 190, for example, may serve as either or both of the listener device and the synch device. According to other examples, other nodes of the network serve as one or both of the listener and synch devices. By way of example only, a plurality of nodes, such as one in each datacenter 160-180, may be designated as listener devices. Further to this example, the controller 190 may serve as the synch device, processing authorization updates to each of the backend systems.

Programs may be executed across the computing devices, for example, such that some operations are executed by one or more computing devices of a first datacenter while other operations are performed by one or more computing devices of a second datacenter. In some examples, the computing devices in the various datacenters may have different capacities. For example, the different computing devices may have different processing speeds, workloads, etc. While only a few of these computing devices are shown, it should be understood that each datacenter 160, 170, 180 may include any number of computing devices, and that the number of computing devices in a first datacenter may differ from a number of computing devices in a second datacenter. Moreover, it should be understood that the number of computing devices in each datacenter 160-180 may vary over time, for example, as hardware is removed, replaced, upgraded, or expanded.

Moreover, various backend systems may be built upon the distributed data store. For example, identity management systems, domain name server (DNS) setting management systems, etc. Such backend systems may to some extent be interrelated. For example, a user of the DNS setting management system may log in using an identification managed by the identity management system. In this regard, authorization parameters providing for access to such backend systems should be consistent. Accordingly, updates impacting access to one backend system, or to another part of the distributed data store, should be efficiently permeated to interrelated backend systems, thereby ensuring that authorization parameters are consistent.

In some examples, each datacenter 160-180 may also include a number of storage devices (not shown), such as hard drives, random access memory, disks, disk arrays, tape drives, or any other types of storage devices. The datacenters 160-180 may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. The datacenters may include a number of other devices in addition to the storage devices, such as cabling, routers, etc. Further, in some examples the datacenters 160-180 may be virtualized environments. Further, while only a few datacenters 160-180 are shown, numerous datacenters may be coupled over the network 150 and/or additional networks.

Client 110, datacenters 160-180, and controller 190 can be capable of direct and indirect communication such as over network 150. For example, using an Internet socket, a client 110 can connect to a service operating on remote servers through an Internet protocol suite. Servers can set up listening sockets that may accept an initiating connection for sending and receiving information. The network 150, and intervening nodes, may include various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and RPC, HTTP, and various combinations of the foregoing. Such communication may be facilitated by a device capable of transmitting data to and from other computers, such as modems (e.g., dial-up, cable or fiber optic) and wireless interfaces.

The client 110 may represent a plurality of client devices. The cloud system or private cloud may provide an environment for a plurality of user accounts, where the user accounts access the cloud system through the client devices 110. Each of the user accounts may be assigned specified privileges to execute particular commands or programs. According to some examples, some user accounts may acquire administrative privileges. Examples of administrative privileges include authority to add a user, upgrade software, etc. The administrative privileges may be acquired permanently or for a specified temporary duration.

UAB works hand in hand with third party software configuration monitoring, which is responsible for after-the-event monitoring of potentially unauthorized activity performed by a customer user. It provides protection for scenarios in which customers may acquire administrative privileges by, for example, explicit means provided by a cloud hosting engine to let a customer become an administrator for the third party software. It also provides for protection for scenarios in which the customer user, acting as an administrator, creates another customer user with administrator privileges.

UAB can also be used as a security monitoring tool in a system consisting of multiple components where higher privilege access might be temporarily requested by users to perform specialized actions on certain objects.

Figure 2:
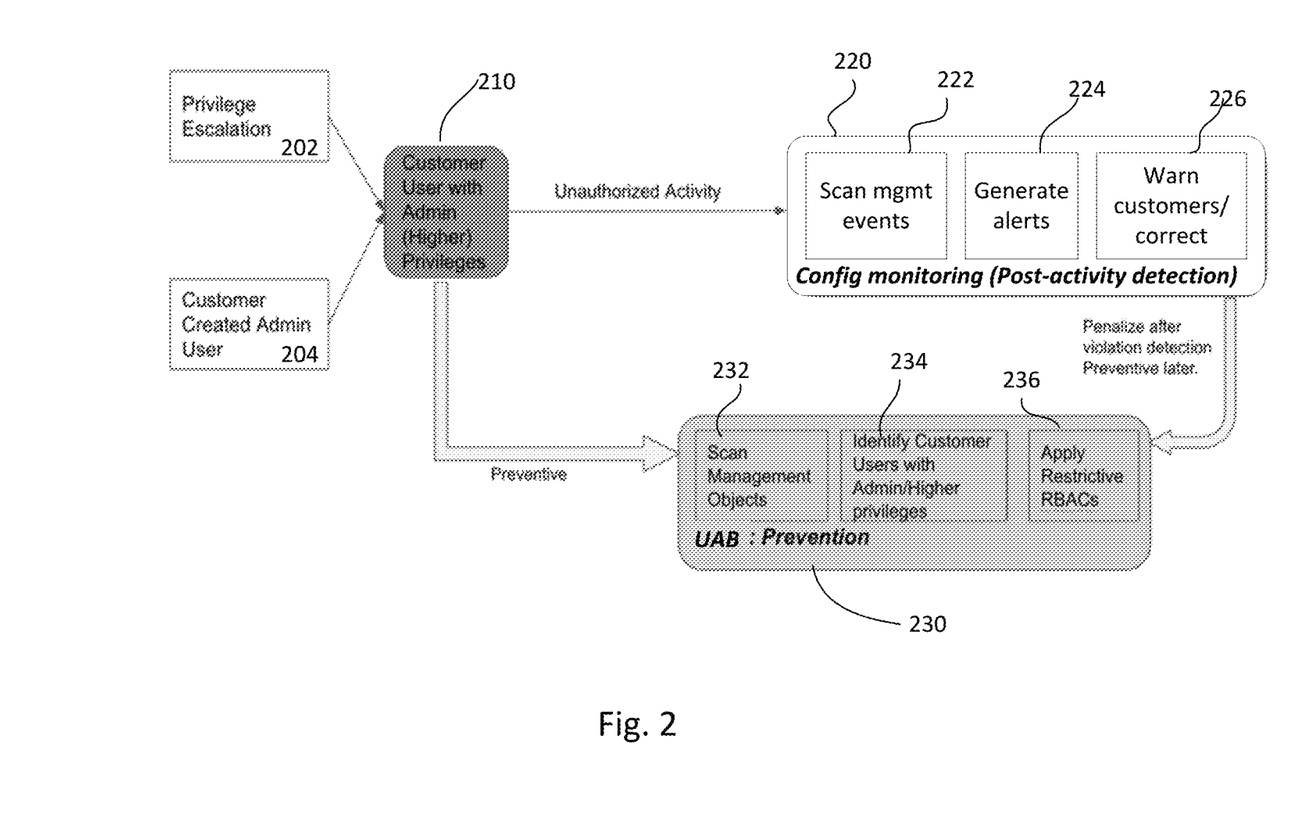
FIG. 2 is a relational block diagram illustrating an example process according to aspects of the disclosure.

FIG. 2 illustrates a flow in which UAB is triggered. As shown, UAB may be triggered in either a preventive mode or a penalizing mode. In the preventive mode, restrictive RBACs are applied as soon as a customer user with higher privileges is detected. This mode enables the maximum safety and prevention against an unauthorized action. Penalizing mode applies restrictive RBACs in response to detection of an unauthorized activity, such as where the unauthorized activity is detected by the configuration monitoring solution. This mode may be selected in scenarios where certain solution users have to be trusted to access protected management objects and privileges are not fine-grained enough to prevent a set of operations while allowing others. In such cases, the default assumption that is made is that users are well behaved and will operate within the bounds of authorized operations. However, if a violation is detected by a user, a penalizing action is taken against the user by applying UAB privileges on protected management objects.

As shown in FIG. 2, in block 210 a customer user acquires administrative privileges, either through privilege escalation 202 or through creation by another customer user 204. If the customer user performs an unauthorized activity, it is detected in block 220 by configuration monitoring services. Such services may scan management events (block 222), generate alerts for unauthorized activity (block 224), and/or warn customers or correct changes made by the unauthorized activity (block 226). After detection, UAB (block 230) may be applied as a penalizing action.

UAB may additionally or alternatively prevent the unauthorized activity altogether. For example, in some cases different protection policies may be desired for different objects, different users, etc. Accordingly, UAB may be used as a penalty for some policies, and as preventive for others. In the preventive context, UAB may periodically scan management objects (block 232), identify customer users with administrative privileges (block 234), and apply restrictive role-based access controls (RBACs) on the identified users (block 236).

The periodic scanning may include periodically monitoring the permissions of customer users on key management objects in the management software object hierarchy. The scanning may be performed, for example, once a minute, once an hour, once a day, or at any other frequency.

Based on the scanning, customer users with higher privileges, such as administrative privileges, are identified. It may be determined that the administrative privileges of the identified user are higher than what the user should have.

If a customer user is detected to have privileges higher than what he should have on a given object, UAB applies restrictive RBACs on the user. For example, the UAB restricts the access of the identified customer user. Similarly, UAB also monitors protected principals and protected roles to ensure that their privileges are not modified by a customer user.

UAB permissions may be applied directly at a user level at any part of the object hierarchy, or at the group level, or as a combination. This ensures that in the event that a user was a member of other groups, which also had permissions on a given object, net effective permissions for a user will correspond to UAB permissions.

According to some examples, new roles may be defined to apply UAB permissions. Each role is a collection of privileges that constitute the restrictive RBACs that are applied on management objects. In one example, multiple roles may be defined. For example, multiple roles may help persistently differentiate the original source of "effective" privilege, thus ensuring that privileges can be restored back efficiently when deleting UAB. Examples of the roles include a UAB role, a UAB indirect user role, and a UAB direct user role. In some examples, the UAB role is applied when the effective source of higher privilege is group membership. The UAB indirect user role is applied when the effective source of higher privilege is an inherited direct-user permission. This is to facilitate easy detection of the source. The UAB direct user role is applied when the effective source of higher privilege is a direct user permission on the relevant object.

Figure 3:
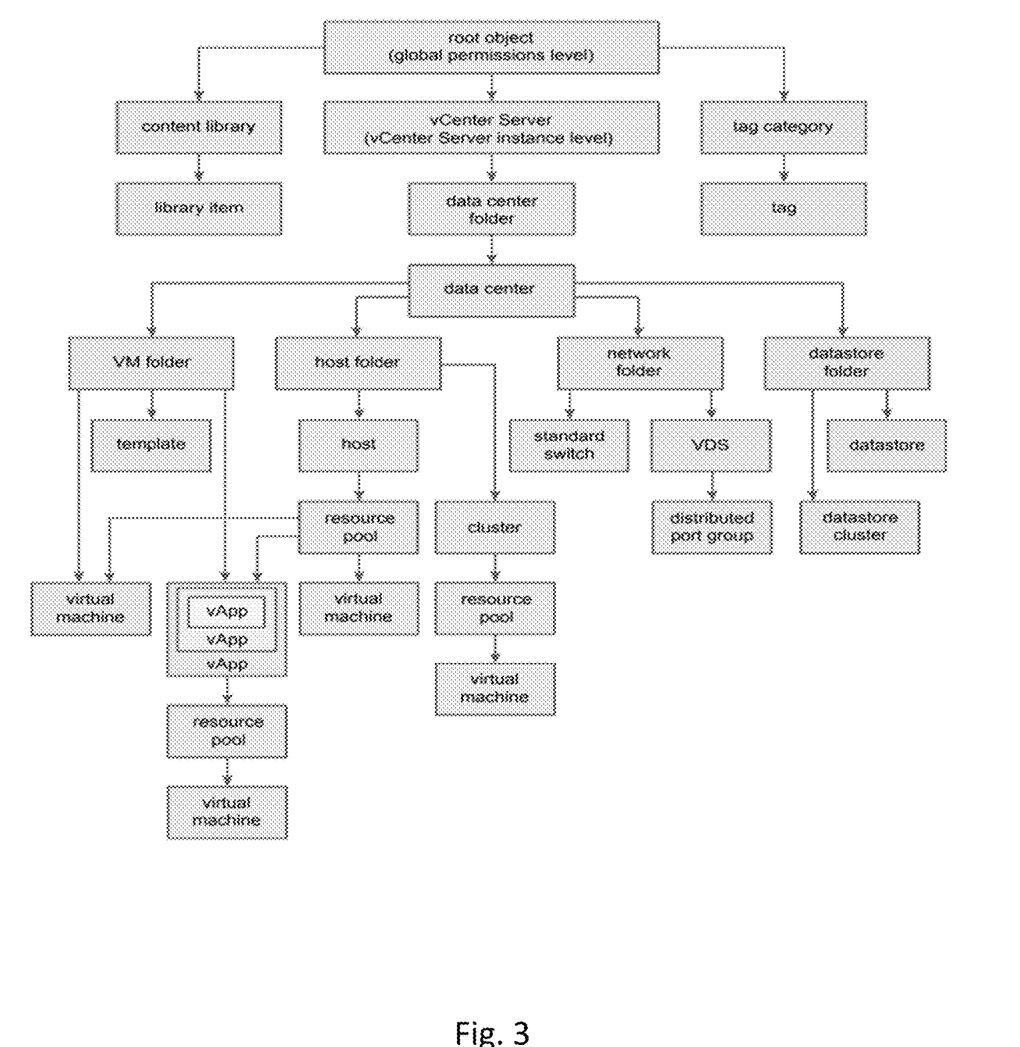
FIG. 3 is a block diagram of an example hierarchy according to aspects of the disclosure.

FIG. 3 shows a cloud computing platform inventory hierarchy depicting various objects and their relationships. Some management server permission models may be based on assigning permissions to such objects in a cloud computing platform object hierarchy. Each permission gives a user or group a set of privileges, called a role, on a given object. A user can obtain direct user-level permission on the object, inherited user-level permission on the object, direct group-level permission on the object, where the user is a member of the group, or inherited group-level permission on the object, where the user is a member of the group.

In some instances, multiple user and group-level permissions may apply to a user. In some examples, effective permission for the user may be computed using one or more rules. By way of example, such rules may include: (1) User-level permissions override group-level permissions; (2) Direct group-level permissions override inherited group-level permissions; (3) If permissions can't be determined based on rules 1 and 2, and the user is a member of multiple groups, effective permissions are computed as the sum of permissions of member groups.

Figure 4:
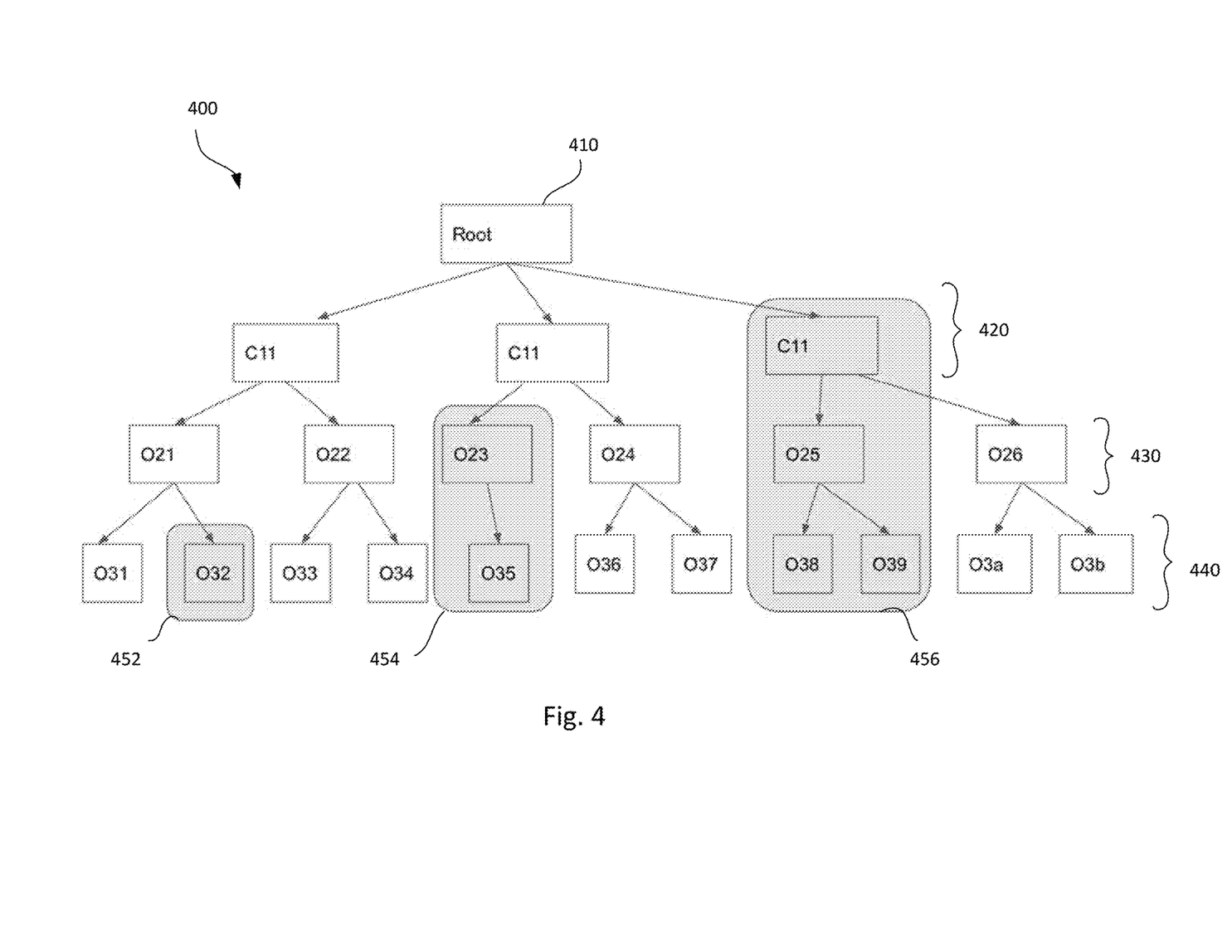
FIG. 4 is a block diagram of an example hierarchical object tree, illustrating protection of selected objects according to aspects of the disclosure.

FIG. 4 illustrates an example of protections created around objects in the hierarchy. As shown, an example hierarchical object tree 400 includes a root node 410, configuration nodes 410, upper level object nodes 420, and lower level object nodes 430.

According to some examples, UAB can create protection around a subset of objects in the object hierarchy. For example, such subsets may include groupings of any one or more objects. In the example shown, a first subset 452 includes object O32, a second subset 454 includes objects O23 and O35 from two different levels of the hierarchy. A third subset 456 includes nodes from three different levels. As UAB protection is applied to the nodes in the subsets 452, 454, 456, those nodes may be considered "protected." While a customer user could have administrative privileges across all objects in the tree, UAB could be applied to any one or more of the subsets 452, 454, 456 representing protected objects. This is true even in a dynamic object tree configuration where new objects or object-subtrees could be added at a later point as a result of operations initiated by either the cloud provider admin or the customer admin.

Figure 5:
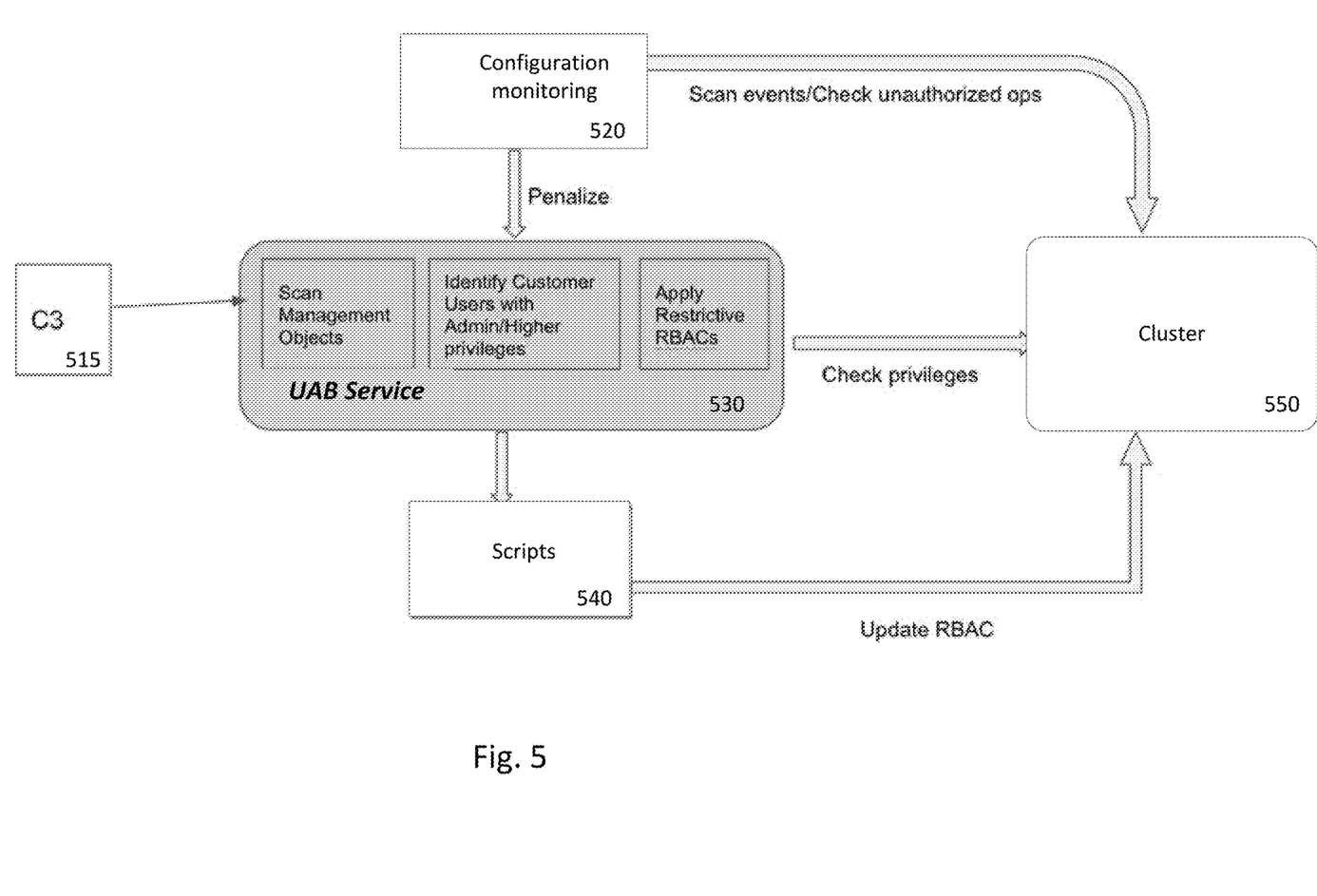
FIG. 5 is a relational block diagram illustrating another example process according to aspects of the disclosure.

FIG. 5 illustrates an example implementation of UAB service 530. In this example, the UAB service 530 runs as an independent container within a pod, such as a Kubernetes pod, in the monitoring space. It retrieves a list of Private Clouds that have to be monitored from a configuration, collection, caching (C3) service 515, and checks the privileges for objects in the list on cluster 550. The cluster 550 may be, for example, a third party software cluster, such as a VMware cluster.

The UAB service 530 further interacts with a set of scripts 540. The scripts 540 are used to effect changes on the third party software cluster 550. An example of the scripts 540 may include Ansible Tower Playbooks. The UAB service 530 interacts with the scripts 540 to effect permission changes, such as by applying restrictive RBACs.

A third party software configuration monitoring service 520 scans events and checks for unauthorized operations in the cluster 550. The configuration monitoring service 520 notifies UAB 530 if a penalizing action should be taken against a higher privileged user. The UAB service 530, in turns, takes action such as applying restrictive RBACs.

Figure 6:
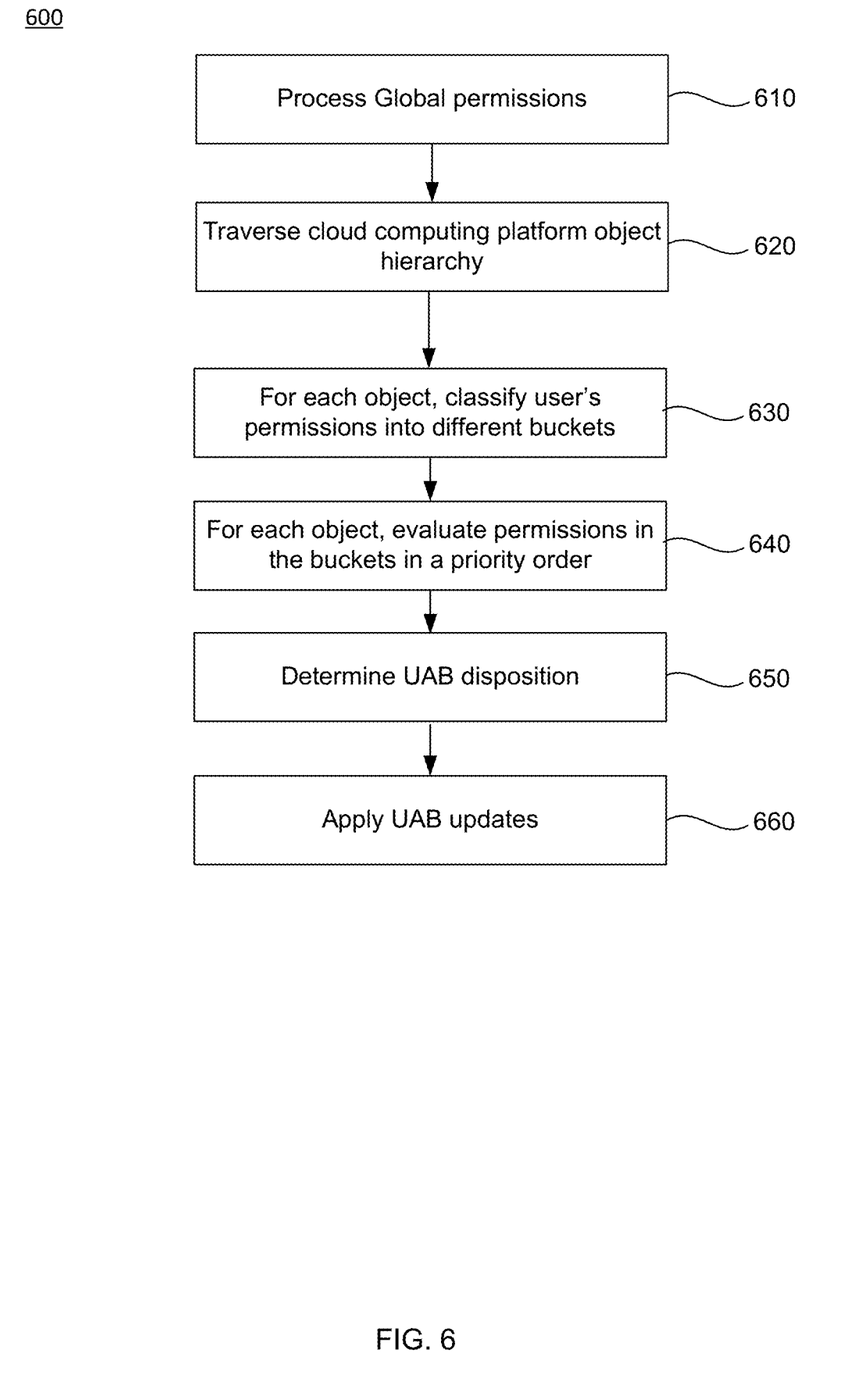
FIG. 6 is a flow diagram illustrating an example method according to aspects of the disclosure.

FIG. 6 illustrates an example method 600 of applying UAB on a hierarchy of protected objects, and deleting UAB permissions once a user's privileges are de-escalated. The cloud computing platform security model allows for both a hierarchical propagation of permissions down the object tree and direct permission assignment at an object level, along with user and/or group membership based permissions. While the operations are described in a particular order, it should be understood that the operations may be performed in a different order or simultaneously. Additionally, operations may be added or removed.

In block 610, global permissions are processed. For example, permissions that apply to all objects in the hierarchy are processed.

In block 620, the object hierarchy is traversed, for example, to consider each individual object. Any of a plurality of algorithms may be used to traverse the hierarchy, such as a Breadth-First-Search (BFS) algorithm. In the BFS algorithm, BFS levels are created, with objects at each level. For example, datacenter objects may be at a top level, followed by cluster objects, etc.

In block 630, user permissions are classified for each object. The permissions may be classified into different buckets. For example, for each "protected" object, the set of permissions is scanned, and relevant users to whom the permissions apply are assigned to particular buckets. Examples of the buckets may include a UAB permissions bucket, a direct user level permissions bucket, an inherited user level permissions bucket, a direct group level permissions bucket, and an inherited group level permissions bucket. The UAB permissions bucket may contain mappings between users and roles for users that have a direct user-level permission, where the role matches one of the UAB roles. The direct user level permissions bucket may include mappings between users and roles for users that have a direct user-level permission on the object. The inherited user-level permissions bucket may include mappings between users and roles for users that have an inherited user-level permission on the object. The direct group level permissions bucket may include mappings between users and roles for groups that have a direct group-level permission on the object. The inherited group-level permissions bucket may include mappings between users and roles for groups that have an inherited group-level permission on the object. It should be understood that these are merely examples, and that additional or fewer buckets may be utilized, as well as buckets of different types. Moreover, a user could be assigned to multiple buckets.

In block 640, for each object, permissions are evaluated in the buckets in a specific priority order. Permission evaluation might require checking buckets of the object's parent object. The result of evaluation is an updated per-object UAB permissions bucket and an effective user privileges map.

For example, for each protected object, an effective user privileges map is initialized, wherein the map stores a privilege disposition for relevant customer users. By way of example only, a schema of the map may be:

user-effective-priv[object]=
{
"user-x":{"priv-level-hi":"true/false", bucket:B/C/D/E},
"user-y":{"priv-level-hi":"true/false", bucket:B/C/D/E}, . . . }

The map may initially be set to NULL, and be populated as the buckets are parsed for each object.

In evaluating the UAB role bucket, for each entry in the bucket a default may be set assuming that UAB permission will get deleted unless another higher level permission on the object reinforces the need to keep the UAB permission intact. If the user has direct permission, or if the user has inherited permission and its parent retains permission, the user may retain permissions. Otherwise the UAB role for the user may be deleted.

In evaluating the direct user level permissions bucket and the indirect user level permissions bucket, for each user in the respective buckets, an entry may be added to a "user-effective-priv" object indicating whether the role corresponding to the user has the appropriate privileges. The same user cannot be in both the direct and indirect user level permissions buckets.

In evaluating the direct group level permissions bucket, for each user in the bucket, check if an entry already exists in the user-effective-priv object. If an entry exists in either of the direct or indirect user level permissions buckets, the user may be ignored. However, if the entry exists elsewhere, and the "role" for the bucket-entry being parsed has higher privileges, then modify the entry with updated value indicating privilege level. If the user doesn't already exist, then a new entry may be created.

Evaluating the indirect group level permissions bucket may be similar to evaluating the direct group level permissions bucket. In particular, for each user in the bucket, check if an entry already exists in the user-effective-priv object. If an entry exists in any of the direct or indirect user level permissions buckets or the direct group level permissions, the user may be ignored. However, if the entry exists elsewhere, and the "role" for the bucket-entry being parsed has higher privileges, then modify the entry with updated value indicating privilege level. If the user doesn't already exist, then a new entry may be created.

In block 650, UAB dispositions are determined. For example, the process may iterate through each object's effective users privileges map to determine if UAB permissions should be newly applied to the object, or retained, or modified. The UAB-permissions bucket may be updated accordingly.

It may be determined that UAB permissions should be newly applied if the user is not already in the UAB permissions bucket. In such case, the user may be added with its new UAB computed based on the bucket in the object's effective users privileges map.

It may be determined that UAB permissions should be retained when the user is already in the UAB permissions bucket, and the user's new role corresponds to the role identified in the UAB permissions bucket. If the user is already in the UAB permissions bucket, but the user's new role is not identified there, it may be determined that UAB permissions should be modified.

In block 660, UAB updated are applied. For example, iterate through each object's UAB-permissions-bucket to determine if UAB permissions have to be applied or deleted, based on the evaluations in the preceding blocks. Management application programming interfaces (APIs) may be invoked to effect the change.

The foregoing techniques are advantageous in that they may reduce friction for lift-and-shift use cases to move to the cloud. Moreover, they allow customers to retain the security policies they are accustomed to in their on-premises configuration, but in a safe manner. Further, they provide a way to flexibly control the access privileges of a customer user based on his actions.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of preventing unauthorized activity in a distributed computing system, comprising:
   periodically scanning, with one or more processors, objects in management software for the distributed computing system, wherein the scanning includes periodically monitoring permissions of customer users with respect to particular objects in the management software object hierarchy;
   identifying, with the one or more processors based on the scanning, the customer users having administrative privileges exceeding a privilege level corresponding to a role of the customer user; and
   applying, with the one or more processors, restrictive role-based access controls (RBACs) for the identified customer users by restricting accesses by the identified customer users to the particular objects, wherein the applying restrictive RBACs comprises:
   executing an Unauthorized Activity Blocker (UAB);
   determining a mode of the UAB based on a security policy;
   monitoring activities of the identified customer by the UAB based on the determination; and
   applying UAB updates to the identified customer users, comprising applying the restrictive RBACs to the identified customer users in response to detection of an unauthorized activity by the identified customer users.

2. The method of claim 1, wherein the periodic scanning is performed prior to an event of unauthorized activity, such that the applying restrictive RBACs is performed as a preventive measure.

3. The method of claim 1, wherein the applying restrictive RBACs is performed as a penalizing measure.

4. The method of claim 1, wherein the applying restrictive RBACs comprises:
   traversing the management software object hierarchy;
   for each object in the hierarchy, classifying the identified customer users' permissions into one or more buckets;
   for each object, evaluating the permissions in the buckets; and
   determining an UAB disposition.

5. The method of claim 4, wherein the one or more buckets comprise at least one of a UAB permissions bucket, a direct user level permissions bucket, an inherited user level permissions bucket, a direct group level permissions bucket, or an inherited group level permissions bucket.

6. The method of claim 4, wherein evaluating permissions comprises generating an effective user permissions map for the object.

7. The method of claim 4, wherein evaluating permissions comprises comparing entries for the identified customer user across the one or more buckets.

8. The method of claim 4, wherein determining the UAB disposition comprises determining whether UAB permissions should be newly applied, retained, or modified based on the evaluating of the permissions.

9. The method of claim 1, wherein applying UAB updates comprises invoking management application programming interfaces.

10. The method of claim 1, wherein identifying customer users with administrative privileges comprises detecting an escalation of a customer's privileges.

11. The method of claim 1, wherein identifying customer users with administrative privileges comprises detecting creation of the customer user with administrative privileges by another customer user.

12. A system for preventing unauthorized activity in a cloud computing system, comprising:
   one or more processors configured to:
   periodically scan objects in management software for the cloud computing system, wherein the scanning includes periodically monitoring permissions of customer users with respect to particular objects in the management software object hierarchy;
   identify, based on the scanning, the customer users having administrative privileges exceeding a privilege level corresponding to a role of the customer user; and
   apply restrictive role-based access controls (RBACs) for the identified customer users by restricting accesses by the identified customer users to the particular objects, wherein in the applying restrictive RBACs, the one or more processors are further configured to:
   execute an Unauthorized Activity Blocker (UAB);
   determine a mode of the UAB based on a security policy;
   monitor activities of the identified customer by the UAB based on the determination; and
   apply UAB updates to the identified customer users, comprising applying the restrictive RBACs to the identified customer users in response to detection of an unauthorized activity by the identified customer users.

13. The system of claim 12, wherein the periodic scanning is performed prior to an event of unauthorized activity, such that the applying restrictive RBACs is performed as a preventive measure.

14. The system of claim 12, wherein the applying restrictive RBACs is performed as a penalizing measure.

15. The system of claim 12, wherein in the applying restrictive RBACs, the one or more processors are further configured to:
   traverse the management software object hierarchy;
   for each object in the hierarchy, classify the identified customer users' permissions into one or more buckets;
   for each object, evaluate the permissions in the buckets; and
   determine an UAB disposition.

16. The system of claim 15, wherein the one or more buckets comprise at least one of a UAB permissions bucket, a direct user level permissions bucket, an inherited user level permissions bucket, a direct group level permissions bucket, or an inherited group level permissions bucket.

17. The system of claim 15, wherein to evaluate permissions the one or more processors are further configured to generate an effective user permissions map for the object.

18. The system of claim 15, wherein to evaluate permissions the one or more processors are further configured to compare entries for the identified user across the one or more buckets.

19. The system of claim 15, wherein to determine the UAB disposition the one or more processors are further configured to determine whether UAB permissions should be newly applied, retained, or modified based on the evaluating of the permissions.

20. The system of claim 12, wherein to apply UAB updates the one or more processors are further configured to invoke management application programming interfaces.

21. The system of claim 12, wherein to identify customer users with administrative privileges the one or more processors are further configured to detect an escalation of a customer's privileges.

22. The system of claim 12, wherein to identify customer users with administrative privileges the one or more processors are further configured to detect creation of the customer user with administrative privileges by another customer user.

23. A non-transitory computer-readable medium storing instructions executable by one or more processors for performing a method of preventing unauthorized activity in a cloud computing system, the instructions comprising:

periodically scanning objects in management software for the cloud computing system, wherein the scanning includes periodically monitoring permissions of customer users with respect to particular objects in the management software object hierarchy;

identifying, based on the scanning, the customer users having administrative privileges exceeding a privilege level corresponding to a role of the customer user; and applying restrictive role-based access controls (RBACs) for the identified customer users by restricting accesses by the identified customer users to the particular objects, wherein the applying restrictive RBACs comprises:

executing an Unauthorized Activity Blocker (UAB);

determining a mode of the UAB based on a security policy;

monitoring activities of the identified customer by the UAB based on the determination; and applying UAB updates to the identified customer users, comprising applying the restrictive RBACs to the identified customer users in response to detection of an unauthorized activity by the identified customer users.

* * * * *